United States Patent [19]

Takahashi

[11] Patent Number: 5,089,201
[45] Date of Patent: Feb. 18, 1992

[54] METHOD FOR PREPARING ELASTIC ROLLER

[75] Inventor: Masaaki Takahashi, Asaka, Japan

[73] Assignee: Canon Kabushiki Kaisha, Tokyo, Japan

[21] Appl. No.: 566,897

[22] Filed: Aug. 14, 1990

Related U.S. Application Data

[63] Continuation of Ser. No. 289,717, Dec. 27, 1988, abandoned.

[30] Foreign Application Priority Data

Dec. 29, 1987 [JP] Japan .................. 62-334795

[51] Int. Cl.$^5$ ................ B29C 45/14; B29C 45/38
[52] U.S. Cl. ................ 264/135; 29/33 A; 29/895.32; 156/287; 264/161; 264/163; 264/265; 264/276; 264/278; 264/328.2; 264/328.9; 264/513; 425/806; 425/DIG. 51
[58] Field of Search ............... 264/510, 102, 138, 161, 264/163, 275, 279, 276, 277, 278, 328.2, 135, 265, 513, 328.9; 425/298, 806, DIG. 5, DIG. 51; 29/895.32, 33 A; 156/267, 278, 250

[56] References Cited

U.S. PATENT DOCUMENTS

| 3,375,312 | 3/1968 | Hart | 264/278 |
|---|---|---|---|
| 3,814,777 | 6/1974 | Schmidt | 264/278 |
| 3,941,635 | 3/1976 | Tavelle et al. | 264/230 |
| 4,009,066 | 2/1977 | Lachenmayer | 264/163 |
| 4,075,273 | 2/1978 | Liautaud | 264/275 |
| 4,318,879 | 3/1982 | Gartner | 264/163 |
| 4,787,841 | 11/1988 | Simon | 264/161 |

FOREIGN PATENT DOCUMENTS

| 2058970 | 6/1972 | Fed. Rep. of Germany | 425/806 R |
|---|---|---|---|
| 159618 | 3/1983 | Fed. Rep. of Germany | 264/276 |
| 54-60381 | 5/1979 | Japan | 264/161 |
| 0049956 | 3/1984 | Japan | 264/279 |
| 0208211 | 11/1984 | Japan | 264/279 |
| 0220349 | 12/1984 | Japan | 264/134 |
| 61-152414 | 7/1986 | Japan | 264/161 |
| 62-183313 | 8/1987 | Japan | 264/328.2 |

Primary Examiner—Jeffery Thurlow
Assistant Examiner—Mathieu Vargot
Attorney, Agent, or Firm—Fitzpatrick, Cella, Harper & Scinto

[57] ABSTRACT

A method for preparing an elastic roller having a layer of elastic material disposed about and integrally molded to a shaft-shaped core metal member, includes the steps of disposing a cylindrical molding device for holding the elastic material, coating the core metal member with an adhesive, and mounting first and second lid members at opposite ends of the molding device. Each lid member holds a respective end of the core metal member so that the core metal member is disposed concentrically within said molding device. A sealing rubber is disposed between each lid member and the core metal member to prevent elastic material from entering a bearing portion of the core metal member, and the elastic material is injected into the molding device. The elastic material is cured, and the lid members are removed such that an extending portion of each lid member removes burrs formed at peripheral end portions of the roller.

6 Claims, 2 Drawing Sheets

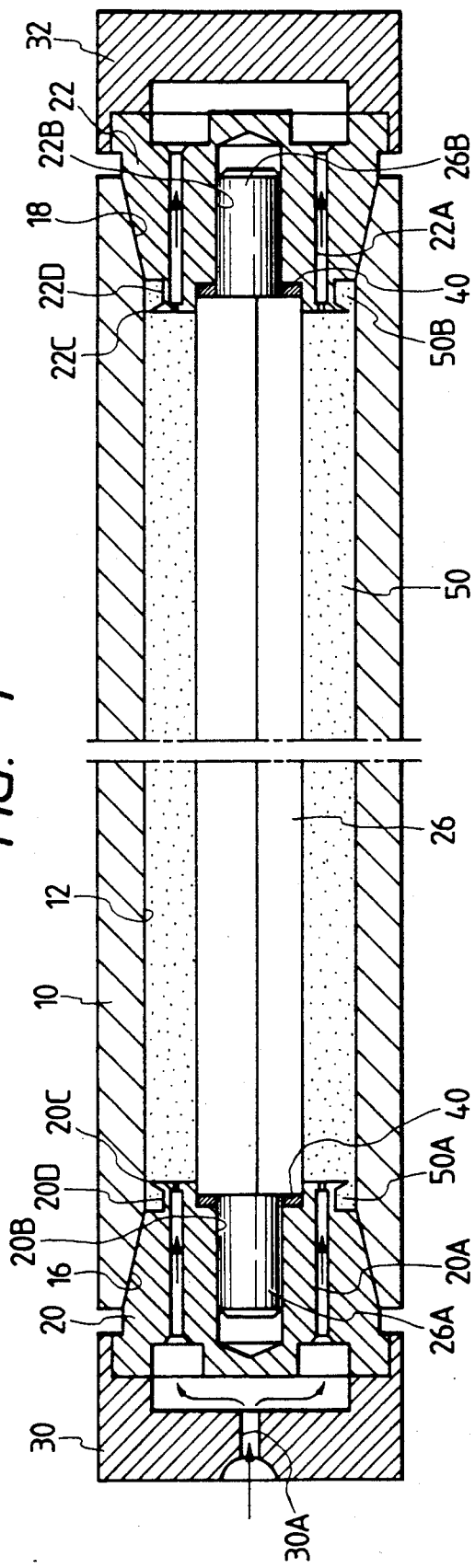
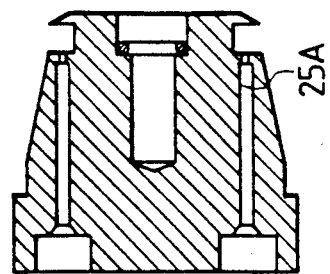
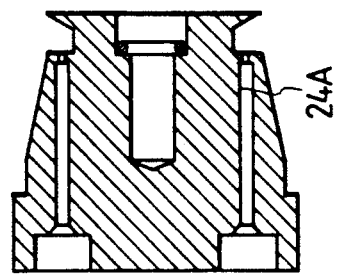
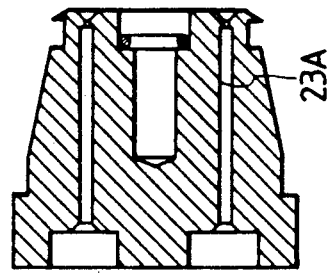
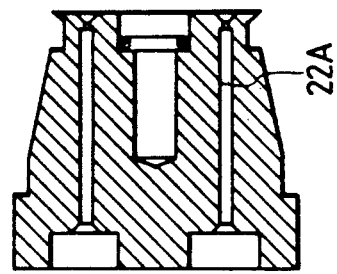

5,089,201

METHOD FOR PREPARING ELASTIC ROLLER

This application is a continuation of application Ser. No. 07/289,717 filed Dec. 27, 1988, now abandoned.

BACKGROUND OF THE INVENTION

1. Field of the Invention

This invention relates to a method for preparing an elastic roller such as pressure roller, cleaning roller and platen roller, etc. and a molding device therefor.

2. Related Background Art

In the prior art, when a roller is molded with a mold cavity in which lid members at both end openings of the cylindrical hole are used for holding a core metal member shaped in a shaft concentrically with the cylindrical hole within a molding cavity having a cylindrical hole extending therethrough, the material flows into the gaps between the molding cavity having cylindrical holes at the both peripheral end portions of the roller and the lid members, and also into the gaps of the core metal holding portions of the lid members, thereby forming burrs. When such burrs exist, there is the fear that the roller may entangle in the burrs when it is mounted on the bearing, whereby it may no longer become rotatable. For this reason, a deburring step for removing such burrs is required, which requires very cumbersome labor. Accordingly, it may be conceivable to use a mold cavity which can be precisely fitted without forming burrs, but when a liquid starting material is used, inflow will occur even through small gaps, thereby forming burrs which can only be removed with difficulty. Also, if the peripheral end portions are completely sealed, air does not escape, whereby there is the problem that air remains at the end portion of the molded roller. Accordingly, it is important to develop a new molding method which prevents air remaining in the molded roller and also requires no burr removal post-treatment for the end portions.

SUMMARY OF THE INVENTION

An object of the present invention is to provide a molding method and a molding device which solve the above problems and make the deburring treatment at the roller peripheral portions and the post-treatment at the bearing portion unnecessary.

Another object of the present invention is to provide a molding method and a molding device which can obtain a finished elastic roller only by molding and demolding.

BRIEF DESCRIPTION OF THE DRAWINGS

The drawings show a representative embodiment of the present invention,

FIG. 1 being a sectional view of the molding device in the molding process,

DETAILED DESCRIPTION OF THE PREFERRED EMBODIMENTS

Figure 2:
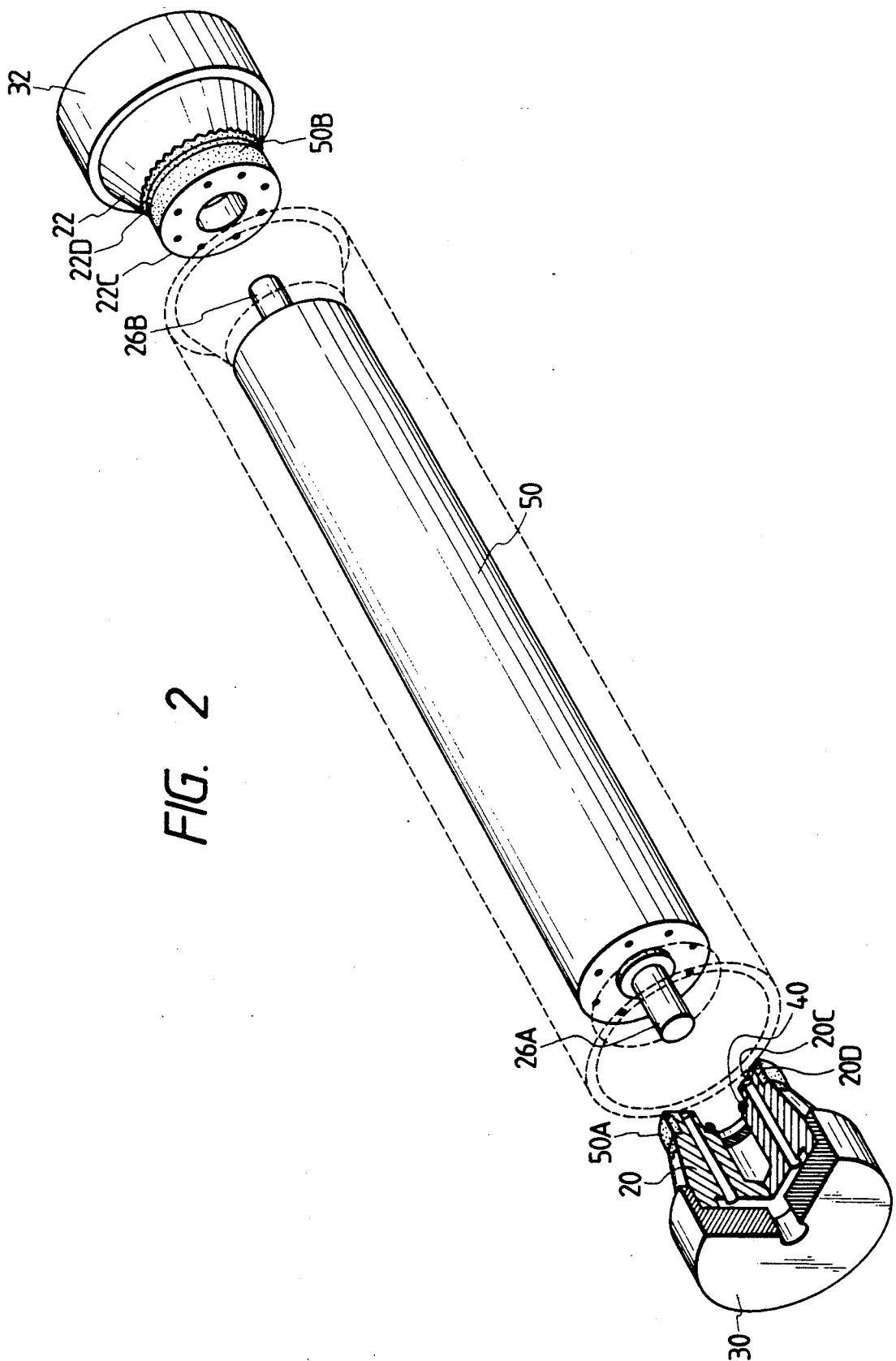
FIG. 2 a perspective view of the state when the lid members are removed during the demolding process, and FIGS. 3A to 3D sectional views of various lid members.

The present invention relates to a method for preparing an elastic roller which is molded by disposing an elastic material cylindrically around a core metal member shaped in a shaft to mold the elastic layer integrally with said core metal member. The elastic material is introduced by pressurization or vacuum evacuation into a molding device having lid members mounted at both end openings of the cylindrical hole for holding the core metal shaft concentrically with said cylindrical hole within a molding cavity having a cylindrical hole extending therethrough. The burrs formed at the peripheral end portions of the elastic roller are removed during dismantling of the above lid members after curing of said elastic material.

Thus, in the molding method of the elastic roller accordng to the present invention, since burrs are also removed during dismantling of the lid members, the deburring treatment at the peripheral end portions of the roller can be made unnecessary.

The molding device according to the present invention has lid members mounted at the cylindrical hole and both end openings of the cylindrical hole within a molding cavity have a cylindrical hole cylindrical therethrough. A concentric groove provided at the peripheral portion of the lid member and the wall of the groove at the end side of the roller is sharply pointed at the tip.

The present invention is described below by referring to the accompanying drawings.

FIG. 1 is a sectional view showing how an elastic roller is molded by the device of this embodiment. FIG. 2 shows the elastic roller completed by this device and how the burrs are removed, and FIGS. 3A to 3D show sectional views of the lid member.

In FIG. 1, 10 is a molding cavity having a cylindrical hole 12 extending therethrough. Said cylindrical hole 12 is applied with horning finishing for ensuring the precision of the outer surface of the elastic roller after molding. The openings 16 and 18 at both ends of the cylindrical hole are tapered with gradually expanded diameters toward the end. To the above openings 16 and 18 are fitted lid members 20 and 22 having outer tapered surfaces fitting to the tapered holes of said openings 16 and 18. The core metal member 26 is held concentrically with the inner surface of said cylindrical hole 12 by being fitted to the holes 20B and 22B on the center axis of said lid members. Also, to the outer part of the lid member 20 on the left side is fitted a lid member cover 30 provided with an injection hole 30A communicating to the outside, and to the outer part of the lid member 22 on the right side is fitted a lid member cover 32 for preventing leakage of the elastic material.

The lid members 20 and 22 are provided at the outer peripheral portions with concentric grooves such as 20D and 22D, which allow an elastic material (such as silicone rubber, urethane rubber, styrene-butadiene rubber, etc.) introduced into the groove to flow, as shown in FIGS. 1, 2 and 3A to 3D. Also, the walls of the grooves on the end side of the roller are pointed sharply at the tips (20 C and 22C), whereby the elastic material can be cut off easily by the pointed tip portions when the above lid members are removed after curing of said material. Besides, the core metal holding portion is provided with a sealing rubber 40 to prevent inflow of the material. Further, the lid members are provided with injection inlets 20A and 22A for the material. The injection inlets 20A and 22A may employ the method of flowing the material directly into the mold as shown in FIGS. 3A and 3B, and the method of flowing the material into the grooves and making the air remaining at the ends of the roller leave by use of the tip pointed portions 24A and 25A as the ring gate as shown in FIGS. 3C and 3D.

Next, the manner of molding of an elastic roller by use of the device of this embodiment will be described.

(1) First, the right end 26B (the left end 26A) of the core metal member 26 previously coated with an adhesive therearound is inserted into the hole of the supporting portion 22B (20B) of the lid member 22 (20).

(2) Next, the above assembly is inserted from the right side (left side) of the cylindrical hole 12 of the molding cavity 10. Said insertion is effected until the tapered portion of the lid member 22 (20) is closely in contact with the tapered opening 18 (16) of the cylindrical hole 12.

(3) Then, another lid member 20 (22) is fitted into the left opening (right opening) of the above cylindrical hole 12. At this time, the end 26A (26B) of the core metal member 26 is adapted to be inserted into the hole of the supporting portion 20B (20A) of the lid member 20 (22). Thus, the above cylindrical hole becomes a sealed space.

(4) Further, to the right side of the right lid member 22 of the above assembly is fitted the lid member cover 32, and to the left side of the left lid member is fitted the lid member cover 30.

(5) Under such state, a low viscosity rubber material, for example, a LTV (low temperature curing type) silicone rubber is injected under pressure through the injection hole 30A via the injection hole 20A of the lid member 20. Then, the LTV silicone rubber injected comes round to the grooves 20D and 22D provided on the lid member cover, and flowes out through the discharging hole 22A of the lid member 22 without air remaining at the portion which becomes the roller. At this time, LTV rubber is degassed by stirring the liquid until it is sufficiently mixed.

(6) After curing of the above rubber, the lid members and the lid member covers at the both ends of the molding cavity 10 are removed integrally from the molding cavity 10. At this time, the portions 50A and 50B flowed into the grooves 20D and 22D of the lid members and cured are cut off integrally with the burrs formed at the lid member tapered portions by the tip pointed portions 20C and 22C. Thus, a deburring treatment at the roller end portions becomes unnecessary.

(7) Finally, the roller is withdrawn in the axial direction from the molding cavity 10 to obtain an elastic roller as shown in FIG. 2.

In the above embodiment, the structure of the wall on the roller end of the groove of the lid member was made as shown in FIG. 3A, but the structures of FIG. 3B or the injection inlet can be changed to the structures as shown in FIGS. 3C and 3D in which the tip pointed portion of the wall is used as the ring gate.

The distance between the tip end of the tip pointed portion of the lid member for removing the burrs formed at the peripheral portion of the elastic roller integrally with the superfluous portion flowed into the grooves provided in the lid members and the inner wall of the cylindrical hole may be preferably 0.5 mm or less, particularly 0.1 mm or less. The tip end of the tip pointed portion may have a shape which can remove burrs easily, such as wedge, saw, arc, etc.

Also, if the inner diameter of the cylindrical hole of the molding cavity is finished to a dimension which has taken the shrinkage of the rubber during curing into consideration, the finishing polishing work of the elastic roller molded can be omitted to effect reduction in cost. Further, injection of the rubber material may also be possible by vacuum evacuation without depending on pressure.

The elastic roller shown in this embodiment can be widely utilized as an elastic roller, and use examples of its use may include a pressure roller of a fixing device in a copying machine, a cleaning roller for a photosensitive member or a platen roller, etc.

What is claimed is:

1. A method for preparing an elastic roller having a layer of elastic material disposed about and integrally molded to a shaft-shaped core metal member, comprising the steps of:

disposing the shaft-shaped core metal member in a cylindrical molding device for holding the elastic material;

coating the core metal member with an adhesive;

mounting first and second lid members at opposite ends of said molding device, each lid member holding a respective end of said core metal member so that said core metal member is disposed concentrically within said molding device;

disposing a sealing rubber between each lid member and said core metal member to prevent elastic material from entering a bearing portion of said core metal member;

injecting the elastic material into said molding device;

curing said elastic material; and removing said lid members such that an extending portion of each lid member removes burrs formed at peripheral end portions of the roller.

2. A method for preparing an elastic roller according to claim 1 wherein the step of removing said lid members includes the step of removing the lid members such that a sharply pointed tip portion of each lid member removes said burrs.

3. A method for preparing an elastic roller according to claim 2 wherein said step of mounting first and second lid members includes the step of mounting first and second lid members such that the sharply pointed tip portion of each lid member is 0.5 mm or less from an inner wall of said molding device.

4. A method for preparing an elastic roller according to claim 2 wherein said step of mounting first and second lid members includes the step of mounting first and second lid members such that the sharply pointed tip portion of each lid member is 0.1 mm or less from an inner wall of said molding device.

5. A method for preparing an elastic roller according to claim 1 wherein said step of mounting first and second lid members includes the step of mounting first and second lid members each having an injection inlet, and wherein said step of injecting includes the step of injecting the elastic material through at least one of said injection inlets.

6. A method for preparing an elastic roller according to claim 1 wherein the step of mounting first and second lid members includes the step of mounting at least one lid member with an injection inlet leading to a concentric groove in the lid member, and wherein said step of injecting includes the step of injecting the elastic material through the injection inlet into the concentric groove.

* * * * *

UNITED STATES PATENT AND TRADEMARK OFFICE
CERTIFICATE OF CORRECTION

PATENT NO. : 5,089,201
DATED : February 18, 1992
INVENTOR(S) : Masaki Takahashi

It is certified that error appears in the above-identified patent and that said Letters Patent is hereby corrected as shown below:

On title page, item

[56] REFERENCES CITED:

FOREIGN PATENT DOCUMENTS, "159618  3/1983  Fed. Rep. of Germany" should read --159618  3/1983  Dem. Rep. of Germany--.

COLUMN 2:

Line 19, "cylindrical" (second occurrence) should read --extending--.

COLUMN 3:

Line 19, "(20A)" should read --(22B)--.
Line 24, "member" should read --member 20--.

Signed and Sealed this

Fourteenth Day of September, 1993

Attest:

BRUCE LEHMAN

*Attesting Officer*        *Commissioner of Patents and Trademarks*